Figure 1:
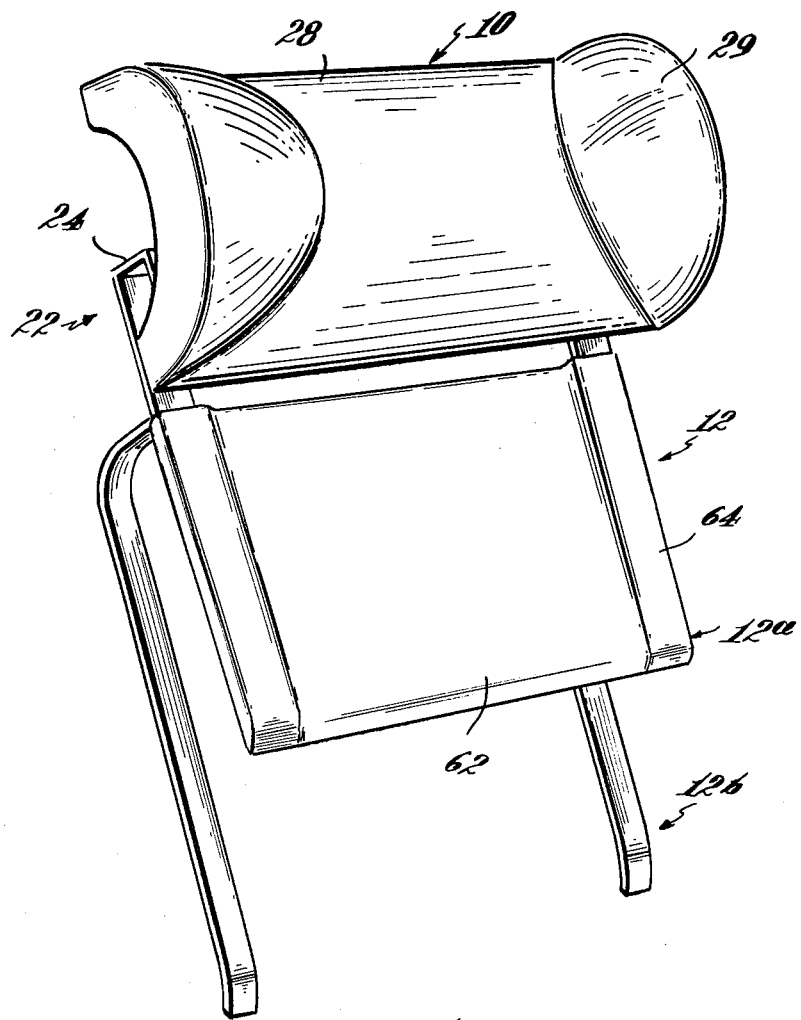

Dec. 28, 1965 K. W. BINDING 3,226,159
HEAD AND NECK REST FOR AUTOMOBILE SEAT BACKS
Filed March 10, 1965 3 Sheets-Sheet 1

INVENTOR.
Kenneth W. Binding
BY
Roberts, Cushman & Grover
ATT'YS

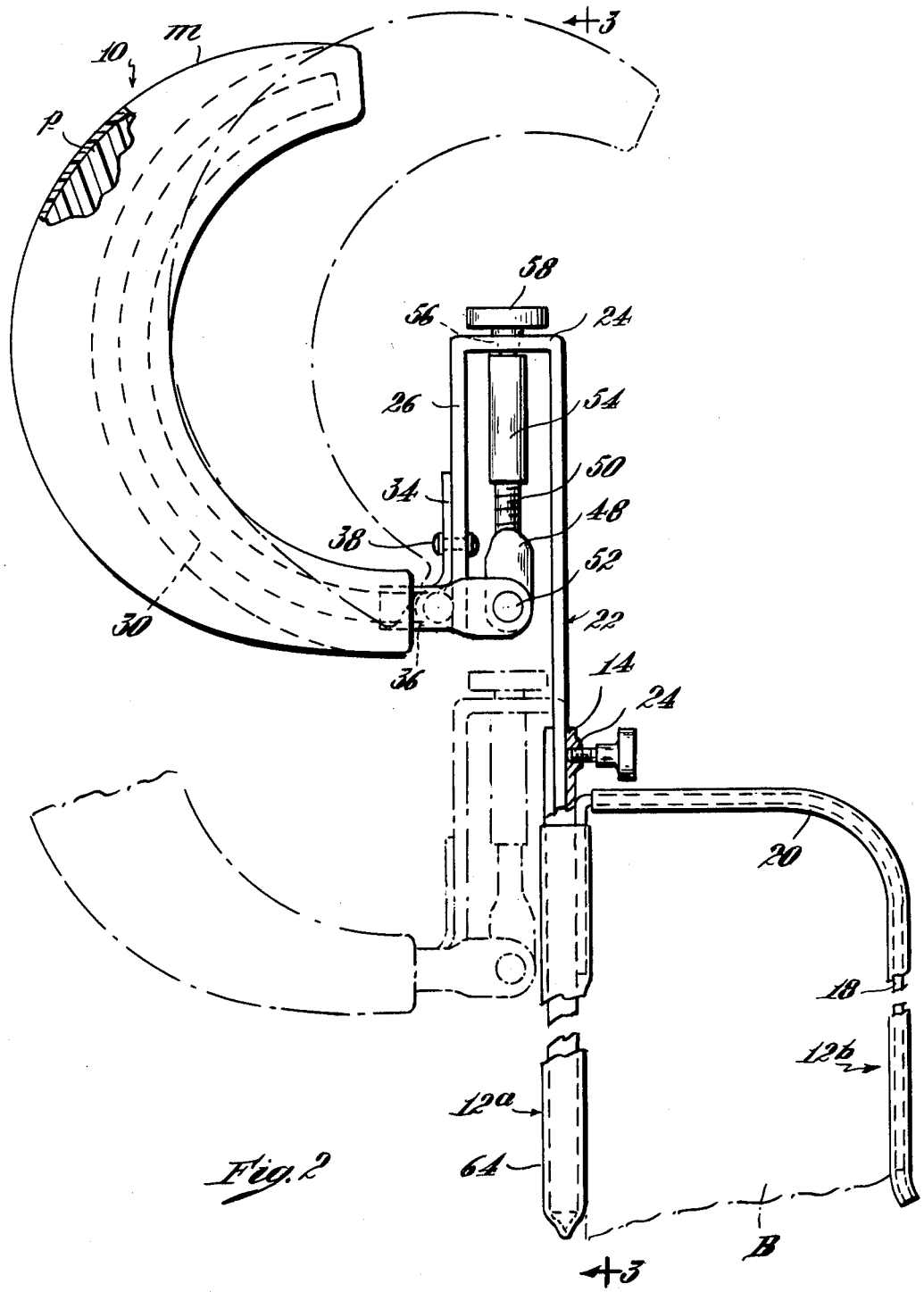

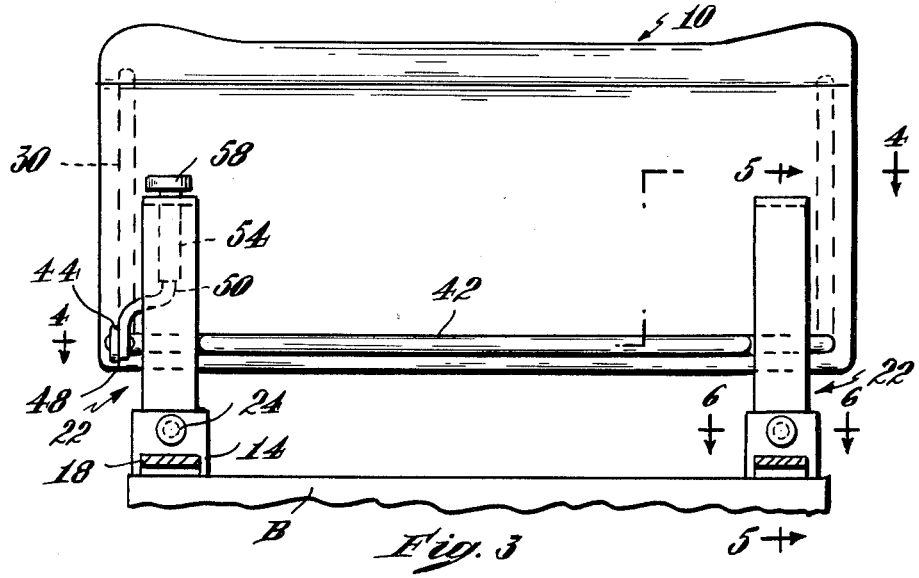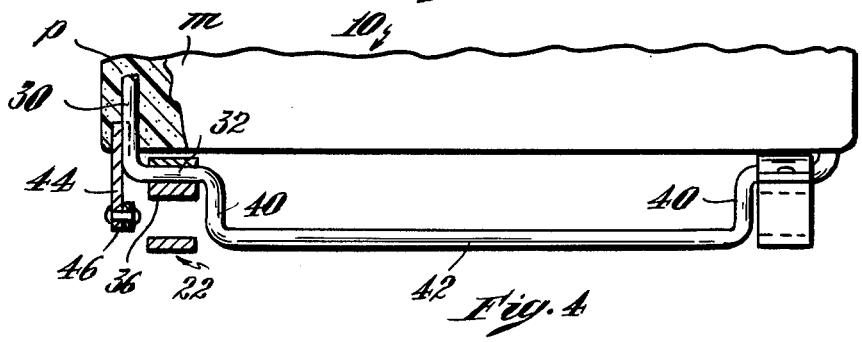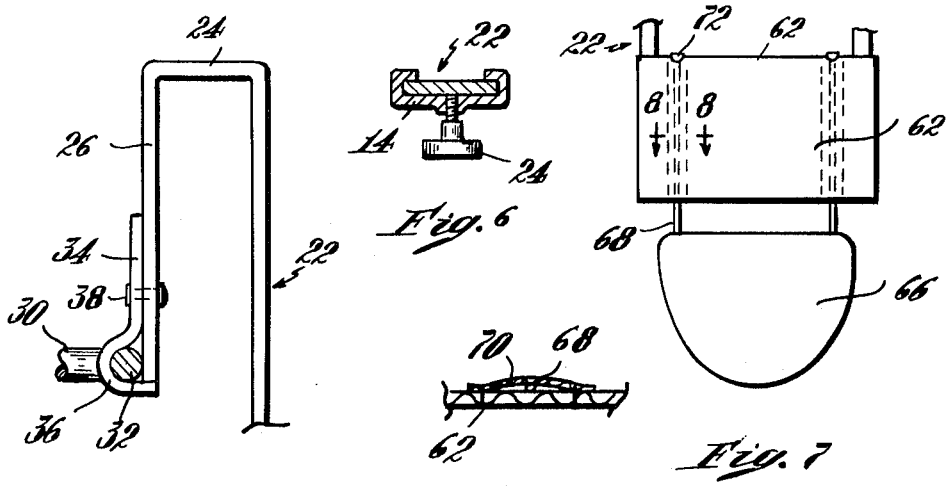

United States Patent Office 3,226,159
Patented Dec. 28, 1965

3,226,159
HEAD AND NECK REST FOR AUTOMOBILE SEAT BACKS
Kenneth W. Binding, Winchester, Mass., assignor to Market Forge Company, Everett, Mass., a corporation of Massachusetts
Filed Mar. 10, 1965, Ser. No. 438,594
10 Claims. (Cl. 297—397)

This invention relates to a head and neck rest for in vehicles and, in particular, to a detachable support for attachment to the backs of automobile seats.

The advent of superhighways, high speed cars, quick-acting brakes, and the like, has resulted in an alarming increase in the number of neck injuries known as "whip lash" in which the vertebra is snapped much like a whip by sudden impact, sharp turns and/or stops, the result of which, depending upon the seriousness of the "whip," requires wearing a supporting collar for long periods of of time and entails extreme discomfort.

The principal objects of this invention are to provide a support for the head and neck of the occupant which will eliminate or at least greatly lessen the possibility of such injuries. Other objects are to provide a head and neck rest which may be applied to the back of the seat of any automotive vehicle; is readily removable when not needed; can be easily adjusted to accommodate the stature of the person, both as to height and as to the sitting position, that is, forwardly or rearwardly relative to the back of the seat; which will not become dislodged by impact; which has no parts which will cause injury to the occupant using it or any other passenger in the vehicle; which is comfortable and may be used as a head and neck rest for one wishing to sleep during long trips; which is attractive in appearance; and which is of relatively simple construction. Other objects are to provide, in conjunction with the head and neck rest as a composite part thereof, support for the back.

As herein illustrated the device comprises transversely spaced supports comprising parts engageable with the front and back of the back of the seat, a flexible part secured between the parts at the front side of the back, adapted to have contact with the front of the seat back, and being operable by rearward pressure of the occupant to increase security of the support, a cushion, and means supporting the cushion between the supports for adjustment upwardly and downwardly relative to the top of the seat back and for angular movement about a horizontal axis forwardly and rearwardly relative to the set back. The transversely spaced supports embody vertically disposed channels at the front side of the seat back and deformable members at the back side of the seat back, the latter being adapted to be conformed by bending to the contour of the top and back of the seat back. The channel members are adapted to receive bracket members for adjustment up and down relative to the seat back and there are screws threaded into the channels for fixing the positions of the brackets therein.

The upper ends of the brackets, as shown, have forwardly and downwardly extending portions and the cushion is pivotally connected to the lower ends of the downwardly extending portions for rotation about a horizontal axis to position the cushion forwardly and rearwardly relative to the top of the seat. The cushion is comprised of foam rubber, or the like, molded to shape, is substantially crescent shaped in cross-section and embodies in its ends molded wire frames of corresponding configuration. The lower ends of the wire frames extend from the rear side of the cushion at its lower edge and form bearings by means of which the cushion is pivotally supported at the lower ends of the downwardly extending portions of the brackets, and there is a crank arm fixed to one of the wire frames and a screw at the upper end of one of the brackets by means of which the crank may be rotated to in turn rotate the cushion forwardly and rearwardly. A lower back support is suspended from the upper flexible part for contact with the lower back and there is means for adjusting the vertical height of this support.

The invention will now be described in greater detail with reference to the accompanying drawings wherein:

FIG. 1 is a perspective of the head and neck rest;
FIG. 2 is a side elevation of the head and neck rest showing the cushion in forwardly and rearwardly adjusted positions and in positions above and below the upper top of the seat back;
FIG. 3 is a rear view of the cushion and the support therefor taken on the line 3—3 of FIG. 2;
FIG. 4 is a horizontal section taken on the line 4—4 of FIG. 3;
FIG. 5 is a vertical section taken on the line 5—5 of FIG. 3;
FIG. 6 is a horizontal section taken on the line 6—6 of FIG. 3;
FIG. 7 is an elevation showing a lower back rest suspended from the flexible back part; and
FIG. 8 is a section taken on the line 8—8 of FIG. 7.

Referring to the drawings (FIG. 1), the head and neck rest comprises a cushion 10 against which the back of the neck of the occupant of the vehicle is adapted to rest and transversely spaced supports 12—12 for supporting the head and neck rest at the top of a seat back B. Each support 12 comprises front and back parts 12a and 12b (FIG. 2) for engagement with the front and back sides of the seat back. The front parts 12a comprise channel members 14 (FIG. 6). The back parts 12b comprise deformable members 18 welded to the rear sides of the channel-shaped members 14 so as to extend rearwardly therefrom and are adapted to be bent downwardly over the rear side of the seat back. These deformable members 18 are given an initial shape which is approximately the dimension of the seat back at the top and to take care of slight differences may be bent so that a sufficient pressure is imparted when the supports are pressed downwardly over the seat backs to hold them in place. Preferably the deformable members 18 are covered with tubular members 20 comprised of rubber, plastic, fabric, or the like, to improve their appearance and to avoid injury by forceable contact therewith.

A pair of brackets 22 (FIGS. 2, 3 and 5) are slidably mounted in the channel members 14 so as to extend upwardly therefrom and their heightwise positions in the channels are adapted to be fixed by screws 24 threaded through the backs of the channels into engagement therewith. The upper ends of the brackets 22 have forwardly extending portions 24 and downwardly extending portions 26 and the cushion 10 is supported at its ends between the lower ends of the downwardly extending portions 26, as will subsequently appear, so that by adjusting the brackets 22 downwardly, as shown in dotted lines (FIG. 2), the lower edge of the cushion may be brought below the top of the seat back for persons of very short stature or raised above the top of the seat back, as shown in full lines, for persons of average or greater than average height.

The cushion 10, as illustrated in FIGS. 1 and 2, is transversely elongate and of generally crescent cross-section. The portion 28 intermediate the ends is cylindrically convex on the forward side and concave on the rear side. The end portions 29—29 have forwardly extending, substantially spherically convex surfaces. Normally the intermediate portion 28 supports the back of the neck and enables the occupant to rest his head without discomfort. The spherically convex end portions 29 prevent the head or neck from sliding off the cushion in the event that the person dozes during driving.

The cushion 10 may be comprised of sponge rubber, expanded plastic or any other relatively soft yieldable material formed or fashioned to the desired shape and is preferably covered with a suitable impervious natural or man-made material.

Wire supporting frames 30—30 are molded into the ends of the cushion parallel to the end surfaces. These end frames 30—30 are composed of relatively small diameter springy wire, as shown in dotted lines in FIG. 2, and extend from the lower edge of the cushion to provide trunnions 32—32 by means of which the cushion is supported for pivotal movement at the lower ends of the parts 26—26. The trunnion portions 32—32 are supported by bearing plates 34—34 (FIG. 5) secured to the lower ends of the parts 26—26, each of which has a hook-shaped end 36 adapted to receive the trunnion 32 and an end engaged with the lower end of the part 26 which holds the bearing plate in place with only one attaching element 38. The trunnions 32—32 are joined to hold the supports 12—12 in spaced relation by rearwardly extending portions 40—40 and a connecting bridge piece 42. A crank arm 44 is attached to the lower projecting portion of one of the end brackets 30 as shown in FIG. 4. The rearwardly extending end of the crank arm contains a hole 46 by means of which it is connected to the lower end 48 of an adjusting bolt 50 by a pin 52. The bolt 50 is threaded into a sleeve 54, the upper end of which is reduced at 56 and rotatably supported in the forwardly projecting part 24 of the bracket 22. A knurled head 58 provides for rotating the sleeve and hence rotation of the crank about the axis of the trunnions 32—32.

A flexible part 62 is stretched between the parts 12a—12a for contact with the front of the seat back. The part 62 may be comprised of any flexible strong fabric or other sheet material and operates by the pressure of the occupant's back therewith on impact to hold the supports in place. The greater the impact the higher the pressure and hence the greater holding power. Conveniently the fabric of the part 62 has at its opposite side pockets 64 open at the top so that a part can be easily slipped on the lower ends of the parts 12a and as conveniently removed if its is desirable to replace or wash the part.

In FIG. 7 there is shown a lower back support 66 generally kidney-shaped, suspended by a pair of cords 68—68 from the part 62. The cords are attached to the rear side of the part 62, for example, by threading through tapes 70 (FIG. 8) sewed to the back side and secured at their upper ends to pulls 72, thus providing means for lowering and raising the back support 66 to position it correctly for back comfort. Preferably the support 66 is substantially flat on its rear side and is forwardly convex on its front side. It is to be understood that the lower back support is entirely optional.

It should be understood that the present disclosure is for the purpose of illustration only and that this invention includes all modifications and equivalents which fall within the scope of the appended claims.

I claim:

1. A head and neck rest comprising transversely spaced supports having parts adapted to have contact with the front and back sides of a seat back frictionally to hold the supports erect, a flexible part secured between said supports, said flexible part being adapted to have contact with the front side of the seat back between said parts and being operable by rearward pressure of the occupant to increase the security of said supports, an elongate yieldable cushion substantially crescent-shaped in cross-section, means supporting the cushion between said supports solely at its ends so that the portion of the cushion intermediate the ends is displaceable rearwardly relative to the supported ends without contact with a fixed part of the structure, said means being adjustable upwardly and downwardly on said supports relative to the top of the seat back and angularly forwardly and rearwardly about a horizontal axis parallel to the lower edge of the cushion relative to the top of the seat back.

2. A head and neck rest comprising transversely spaced supports having parts adapted to have contact with the front and back sides of a seat back frictionally to hold the supports erect, a flexible part secured between the parts at the front side of the seat back, said flexible part being adapted to have contact with the front side of the seat back between said parts and being operable by pressure of the occupant to increase the security of said supports, an elongate cushion crescent-shaped in cross-section, means supporting the cushion solely at its ends, said means comprising bent resilient wires embedded in the ends in planes parallel to the cross-section of the cushion so that the portion of the cushion intermediate the supporting means is rearwardly displaceable relative to the supported ends without contact with a fixed part of the structure, said supporting means being mounted for adjustment on the supports up and down relative to the top of the seat back from a position in which the lower edge of the cushions is below the top of the seat back to a position in which it is above the top of the seat back and for angular movement about a horizontal axis parallel to the lower edge of the cushion forwardly and rearwardly relative to the top of the seat back.

3. A head and neck rest comprising transversely spaced supporting members having parts adapted to have contact with the front and back sides of a seat back to hold the supports erect, a flexible part secured between the parts at the front side of the seat back, the flexible part being adapted to have contact with the front side of the seat back beween the parts having contact with the front side of the seat back and being operable by rearward pressure of the occupant to increase the security of said supports, an elongate cushion crescent-shaped in cross-section having a forwardly convex surface and rearwardly extending limbs, a pair of transversely spaced bracket parts mounted on the parts having contact with the front side of the seat back, said bracket parts being adjusted upwardly and downwardly relative to the top of the seat back, bearings on said bracket parts, and means projecting from the lower limb of the cushion solely at the ends thereof supporting said cushion on said bearings for rotation about a horizontal axis parallel to the lower limb of the cushion and the top of the seat back.

4. A head and neck rest comprising supports adapted to be pressed over the top of a seat back for engagement with the front and back sides thereof, bracket parts mounted on the supports, said bracket parts rising from the top of the seat back, a transversely elongate cushion of substantially lenticular cross-section situated between said bracket parts with its convex side facing forwardly, said cushion comprising a plastic sponge, end members embedded in the ends of the said cushion, said end members having parts extending from the lower edge of the cushion, providing trunnions parallel to the lower edge, means on said bracket parts in which are journaled the trunnions, a crank arm extending rearwardly from the axis of one of the trunnions, and means connected to the crank operable to turn the trunnions in the bearings and hence the end frames about said horizontal axis parallel to the seat back.

5. A seat back according to claim 4, wherein the end members are embedded in the ends of the cushion parallel to the ends thereof, and there is a bridge piece connecting the trunnions, said bridge piece being an integral part of the end members and providing a spacer which holds the supports in spaced relation to each other.

6. A head and neck rest according to claim 5, wherein a screw is pivotally connected at one end to the crank arm, an internally threaded sleeve is rotatably mounted on the screw, and there is means rotatably connecting the sleeve to one of said bracket parts so that rotation of the sleeve effects rotation of the crank arm.

7. A head and neck rest according to claim 4, wherein the flexible parts has at its opposite ends tubular pockets for receiving the parts which have contact with the front of the seat back.

8. A head and neck rest according to claim 4, wherein the upper ends of the bracket parts are contained within the concave side of the cushion.

9. A structure comprising an elongate cushion substantially crescent-shaped in cross-section having a forwardly convex, substantially cylindrical front side and rearwardly projecting limbs, supports embedded in the ends of the cushion, said supports having portions projecting rearwardly from the lower limb of the cushion, a rod spaced rearwardly from the lower limb and parallel thereto, said rod rigidly connecting said rearwardly projecting portions of the supports, a pair of transversely spaced bearings supporting the rod adjacent said rearwardly projecting portions of the supports for rotation of the rod about its longitudinal axis and angular movement of the cushion about its lower limb, a pair of transversely spaced brackets of inverted U-shape having spaced parallel legs of different length, means securing the bearings to the lower ends of the shorter legs, a pair of transversely spaced seat back embracing members comprising parts at the front side of the seat back within which are slidably disposed the longer of the legs and parts conformable to the top and back side of the seat back, and means threaded through said parts at the front side of the seat back into engagement with the leg situated therein operable to fix the leg in a predetermined position of heightwise adjustment, said longer legs being adjustable in said parts to position the cushion above or below the top of the seat back.

10. A structure according to claim 9, wherein there are spherically convex end portions at the opposite ends of the convex side of the cushion.

References Cited by the Examiner

UNITED STATES PATENTS

| 2,619,362 | 11/1952 | Low _____ | 297—391 |
| 2,624,397 | 1/1953 | Staubin _____ | 297—231 |
| 2,632,497 | 3/1953 | Brady _____ | 297—231 |
| 2,807,313 | 9/1957 | Kaufman _____ | 297—231 |
| 2,990,008 | 6/1961 | Bien _____ | 297—397 |
| 3,029,107 | 4/1962 | Myers _____ | 297—399 |

FRANK B. SHERRY, *Primary Examiner.*

C. A. NUNBERG, *Assistant Examiner.*